US006599987B1

(12) United States Patent
Galiatsatos et al.

(10) Patent No.: US 6,599,987 B1
(45) Date of Patent: Jul. 29, 2003

(54) WATER SOLUBLE, CURABLE COPOLYMERS, METHODS OF PREPARATION AND USES THEREOF

(75) Inventors: Vassilios Galiatsatos, Odessa, TX (US); Yong-Chang Zheng, Watertown, MA (US)

(73) Assignee: The University of Akron, Akron, OH (US)

( * ) Notice: Subject to any disclaimer, the term of this patent is extended or adjusted under 35 U.S.C. 154(b) by 16 days.

(21) Appl. No.: 09/669,816

(22) Filed: Sep. 26, 2000

(51) Int. Cl.[7] .............................. C08F 8/32; C08F 26/10; C08F 226/10
(52) U.S. Cl. ................... 525/326.9; 525/379; 525/380; 525/381; 525/382
(58) Field of Search ............................ 525/326.9, 379, 525/380, 381, 382

(56) References Cited

U.S. PATENT DOCUMENTS

| | | | |
|---|---|---|---|
| 3,704,229 A | 11/1972 | Tashiro et al. | |
| 3,907,737 A | 9/1975 | Marx et al. | |
| 3,954,898 A | 5/1976 | Hirota et al. | |
| 4,002,171 A | 1/1977 | Taft | |
| 4,042,645 A | 8/1977 | Hirota et al. | |
| 4,093,594 A | 6/1978 | Anderson | |
| 4,110,354 A | 8/1978 | Bertram et al. | |
| 4,112,188 A | 9/1978 | Dahms | |
| 4,143,188 A | 3/1979 | Huber-Nuesch et al. | |
| 4,250,100 A | 2/1981 | Bertram et al. | |
| 4,268,542 A | 5/1981 | Sakakibara et al. | |
| 4,273,921 A | 6/1981 | Bertram et al. | |
| 4,381,200 A | 4/1983 | Bolen et al. | |
| 4,491,654 A | 1/1985 | Cummings | |
| 4,495,235 A | 1/1985 | Tesch | |
| 4,506,060 A | 3/1985 | White, Sr. et al. | |
| 4,507,355 A | 3/1985 | George et al. | |
| 4,539,347 A | 9/1985 | DeGooyer | |
| 4,571,356 A | 2/1986 | White, Sr. et al. | |
| 4,587,291 A | 5/1986 | Gardziella et al. | |
| 4,608,405 A | 8/1986 | DeGooyer | |
| 4,610,919 A | 9/1986 | Kent | |
| 4,681,815 A | 7/1987 | Rutkiewic et al. | |
| 4,695,606 A | 9/1987 | Floyd et al. | |
| 4,879,173 A | 11/1989 | Randall | |
| 4,917,764 A | 4/1990 | Lalwani et al. | |
| 5,055,341 A | 10/1991 | Yamaji et al. | |
| 5,063,103 A | 11/1991 | Sugawara et al. | |
| 5,075,155 A | 12/1991 | Jellinek et al. | |
| 5,077,348 A | 12/1991 | Nakamura et al. | |
| 5,080,968 A | 1/1992 | Riew et al. | |
| 5,096,954 A | 3/1992 | Yamada et al. | |
| 5,143,582 A | 9/1992 | Arkens et al. | |
| 5,168,011 A | 12/1992 | Kovar et al. | |
| 5,169,700 A | 12/1992 | Meier et al. | |
| 5,178,657 A | 1/1993 | Gicquel | |
| 5,179,172 A | 1/1993 | Chan et al. | |
| 5,258,227 A | 11/1993 | Gaa et al. | |
| 5,364,910 A | * 11/1994 | Takinishi et al. | ........... 525/375 |
| 5,399,604 A | 3/1995 | Sano et al. | |
| 5,567,748 A | 10/1996 | Klein et al. | |
| 5,616,363 A | 4/1997 | Ushida et al. | |
| 5,644,010 A | 7/1997 | Kurihashi et al. | |
| 5,663,258 A | 9/1997 | Zhong et al. | |
| 5,708,059 A | 1/1998 | Pfeil et al. | |
| 5,741,835 A | 4/1998 | Stark | |
| 5,756,777 A | 5/1998 | Shinohara et al. | |
| 5,763,506 A | 6/1998 | Papalos et al. | |
| 5,770,657 A | 6/1998 | Chou et al. | |
| 5,798,399 A | 8/1998 | Griggs et al. | |

OTHER PUBLICATIONS

The Merck Index, 11th ed., Budavari et al. ed., Merck & Co., Inc., p. 1157 (1989).*
English language abstract of Japanese Patent No. J03056557–A, Assignee: Sumitomo Chem Ind.
English language abstract of Japanese Patent No. J71015032–B, Assignee: Lignite Co. Ltd.
Bottle, S., et al.; Eur. Polym. J., vol. 25, No. 7/8, p. 671–676, 1989.
Haaf, F., Sanner, A., and Straub, F.; Polymer Journal, vol. 17, No. 1, p. 143–152, 1987.
Huglin, M.B. and Zakaria, M.B.;J. Applied Polym. Sci., vol. 31, p. 457–475, 1986.
Linke, W. and Vogel, F.G.M.; Polymer News, vol. 12, p. 232–237, 1987.
Nazarova, O.V. et al.; Eur. Polym. J., vol. 28, No. 1, p. 97–100, 1992.
Semchikov, Yu. D., et al.; Eur. Polym. J., vol. 26, No. 8, 889–891, 1990.
Nagaoka, Shoji and Akashi, Ryojiro; "Low Friction Hydorphilic Surface for Medical Devices", *Journal of Bioactive and Compatible Polymers*, Apr. 1990, p. 212–226, vol. 5.

* cited by examiner

Primary Examiner—D. R. Wilson
(74) Attorney, Agent, or Firm—Renner, Kenner, Greive, Bobak, Taylor & Weber

(57) ABSTRACT

The present invention provides cured, compositions of matter that are non-swellable in water after curing. In general, the compositions comprise a water soluble copolymers comprising vinylpyrrolidone and glycidyl acrylate and a water soluble secondary aromatic amine or aliphatic ring diamine. The present invention further provides a cured composition of matter that is non-swellable in water after curing, comprising a water soluble copolymer comprising acrylamide and glycidyl methacrylate; and a water soluble secondary aromatic amine. The present invention also provides methods of preparation of the compositions and uses thereof.

7 Claims, 6 Drawing Sheets

WATER SOLUBLE, CURABLE COPOLYMERS, METHODS OF PREPARATION AND USES THEREOF

TECHNICAL FIELD OF THE INVENTION

The present invention relates to water soluble, curable compositions of matter. The present invention is more particularly related to water soluble, curable copolymers of vinylpyrrolidone with glycidyl acrylate and acrylamide with glycidyl methacrylate.

BACKGROUND OF THE INVENTION

In general, there are three polymer systems that are conventionally used as binders for fiberglass, namely phenolic-formaldehyde resins, epoxy resins, and unsaturated polyesters.

While some phenolic-formaldehyde resins may be water soluble, the problem of formaldehyde emission into the environment remains a disadvantage to the use of this type of binder system for fiberglass.

Epoxy resins have traditionally been good binders for fiberglass, as the epoxy resins exhibit satisfactory mechanical properties. Epoxy resins, however, are of high viscosity and are generally insoluble in water and cannot be applied to fiberglass by spraying techniques.

Unsaturated polyesters are also widely used as binders for fiberglass. Generally, unsaturated polyesters are prepared from a diacid and diol. The resulting polyester molecules contain double bonds which can be crosslinked with vinyl monomers, such as styrene. The styrene is traditionally used to create a binder system of low viscosity that is rendered sprayable. The use of styrene, however, remains an environmental problem.

Tashiro et al, U.S. Pat. No. 3,704,229, discloses a water insoluble epoxide curing agent for glycidyl ethers of polyhydric phenols. The curing agent comprises (A) an ester of acrylic or methacrylic acid; (B) a slightly water soluble or water insoluble aliphatic amine; and (C) xylene diamine.

Hirota et al., U.S. Pat. No. 3,954,898, discloses a powder coating of epoxy resin, acrylic copolymer and tertiary amine comprising a copolymer of (A) an alkyl acrylate and (B) glycidyl acrylate or glycidyl methacrylate. The copolymer is further reacted with a cross-linking compound or an epoxy compound in the presence of a tertiary amine.

Anderson, U.S. Pat. No. 4,093,594, discloses a process for preparing cathodically depositable polyepoxide resin compositions comprising: adducting a polyepoxide resin, such as glycidyl polyethers of polyhydric phenols with alkylene polyamines, such as o, m, and p-phenylene diamine and 4,4'-methylene dianiline. The resulting polyepoxide-polyamine adduct is further modified with long chain monoepoxide or monocarboxylic acids.

Bertram et al., U.S. Pat. Nos. 4,250,100 and 4,273,921, disclose water-soluble epoxy resins comprising a glycidyl ether of glycerine and a process for its preparation. The water-soluble epoxy resin of the reference is prepared by the reaction of epoxyalkyl halides, such as epichlorohydrin, and glycerine in the presence of a Lewis Acid. The resulting compound is at least partially dehydrohalogenated with a base or an alkaline-acting material such as potassium hydroxide, sodium hydroxide, sodium and potassium carbonates, hydroxides of magnesium, zinc, lead, iron, aluminum and the like, as well as aluminates, silicates, zincates of alkali metals, to produce the water soluble glycidyl ethers of glycerine.

DeGooyer, U.S. Pat. No. 4,539,347, discloses a novolac based epoxy resin curing agent for use in aqueous systems prepared by reacting a novolac epoxy resin comprising the reaction product of (A) an aldehyde, such as formaldehyde, and (B) a polyphenolic material. The novolac epoxy resin is reacted with a polyalkenamine and end-capped with a monoepoxide or monocarboxylic acid. The epoxy resin curing agent of the reference is salted with acrylic or methacrylic acid to render it water soluble.

DeGooyer, U.S. Pat. No. 4,608,405, discloses an aqueous based epoxy resin curing agent prepared by coreacting a diglycidyl ether of a dihydric phenol, a diglycidyl ether of an aliphatic dihydroxy polyether and a dihydricphenol to form a mixed aliphatic/aromatic polyether diepoxide product. A polyamine is added to the mixed aliphatic/aromatic polyether diepoxide. Finally, the composition is end capped with a monoepoxide or a monocarboxylic acid.

Riew et al., U.S. Pat. No. 5,080,968, discloses composites of vinyl resins and elastomer-coated fibers comprising: (A) a vinyl resin, such as acrylamide and (B) an elastomer-coated fiber material, wherein the coating composition comprises a liquid reactive polymer, such as an acrylate, an aliphatic or aromatic epoxy resin and an amine curing agent, such as the aromatic amines. In a preferred embodiment, graphite fibers are coated with the coating composition, however, the reference discloses that any solid fiber may be coated with the composition.

Yamada et al., U.S. Pat. No. 5,096,954, discloses an aqueous coating composition comprising an acrylic resin and a spiroguanamine resin. The acrylic resin comprises five components, including alkyl-methacrylate.

Gicquel, U.S. Pat. No. 5,178,657, discloses a phenolic binder system for insulating glass fibers comprising: (A) an epoxy resin, based on the reaction product of epichlorohydrin and bisphenol A; (B) an amine hardening (or curing) agent, such as a polyamine; (C) silane; and (D) mineral oil. The binder composition is water dispersable and exhibits low evolution of pollutants.

Chan et al., U.S. Pat. No. 5, 179,172, discloses modified amino compounds, such as imidazole compounds, which are used as curing agents for epoxy resins comprising the reaction product an amino compound and an epichlorohydrin oligomer, a chlorine containing oligomer, or a copolymer of an alkyl acrylate or methacrylate with a chloroethyl vinyl etheralphachlorovinyl acetate.

Gaa et al., U.S. Pat. No. 5,258,227, discloses chemically treated glass fibers with a copolymer of vinylpyrrolidone and acrylate. The composition may further comprise an epoxy copolymer and an amine curing agent.

Ushida et al., U.S. Pat. No. 5,616,363, discloses a binder composition for glass fiber non-woven fabric comprising (A) an epoxy resin, such as a bisphenol A type epoxy resin, (B) a water soluble aliphatic amine curing agent, and (C) an acid to impart solubility to the binder composition.

Zhong et al, U.S. Pat. No. 5,663,258, discloses strongly-swellable, moderately-crosslinked copolymers of vinylpyrrolidone and vinyl acetate (PVP/VA). The PVP/VA copolymer of the Zhong reference is formed by coprecipitation in an organic solvent, such as cyclohexane or heptane, in the presence of a free radical initiator and a crosslinker material, such as N,N'-divinylimidazolidone, 1-vinyl-3(E)-ethylidene pyrolidone, pentaerythritol triallyl ether, triallyl-1,3,5-triazine-2,4,6(1H,3H,5H)-trione and 2,4,6-triallyloxy-1,3,5-triazine. The resulting PVP/VA copolymer is water insoluble.

Therefore, is remains desirable in the art to provide compositions of matter, binders and coatings that are water-based and which do not involve solvents, that have a low viscosity which results in a sprayable composition, good fiber wettability, heat or ultraviolet curable, good mechanical properties after curing and that are environmentally sound.

SUMMARY OF THE INVENTION

It is, therefore, one aspect of the present invention to provide water soluble, curable compositions.

It is another aspect of the present invention is to provide a process for the preparation of water soluble, curable compositions.

It is another aspect of the present invention is to provide binders comprising water soluble, curable compositions.

It is another aspect of the present invention is to provide adhesives comprising water soluble, curable compositions.

It is another aspect of the present invention is to provide coatings comprising water soluble, curable epoxy resins.

The foregoing objects, together with the advantages thereof over the known art relating to water soluble, curable copolymers and binder compositions, which shall become apparent from the specification which follows, are accomplished by the invention as hereinafter described and claimed.

The present invention, therefore, provides a cured composition of matter that is non-swellable in water comprising a water soluble copolymer comprising vinylpyrrolidone and glycidyl acrylate and one of a water soluble aromatic amine or an aliphatic ring amine.

The present invention also provides a cured composition of matter that is non-swellable in water produced by the process comprising the steps of copolymerizing vinylpyrrolidone and glycidyl acrylate; and crosslinking said copolymer of vinylpyrrolidone and glycidyl acrylate with one of a aromatic amine or an aliphatic ring amine.

The present invention also provides a process for preparing a cured composition of matter that is non-swellable in water comprising copolymerizing vinylpyrrolidone with glycidyl acrylate; and crosslinking said copolymer of vinylpyrrolidone and glycidyl acrylate with one of a aromatic amine or an aliphatic ring amine.

The present invention also provides binders, adhesives and coatings comprising a cured composition of matter that is non-swellable in water comprising a cured copolymer of vinylpyrrolidone and glycidyl acrylate.

The present invention also provides a curable, water soluble composition of matter comprising a water soluble copolymer comprising a copolymer of acrylamide and glycidyl methacrylate and one of a water soluble aromatic amine or an aliphatic ring amine.

The present invention also provides a cured composition of matter that is non-swellable in water produced by the process comprising copolymerizing acrylamide with glycidyl methacrylate; and crosslinking said copolymer of acrylamide and glycidyl methacrylate with one of a aromatic amine or an aliphatic ring amine.

The present invention also provides a process for preparing a cured composition of matter that is non-swellable in water comprising copolymerizing acrylamide with glycidyl methacrylate; and crosslinking said copolymer of acrylamide and glycidyl methacrylate with one of a aromatic amine or an aliphatic ring amine.

The present invention also provides binders, adhesives and coatings comprising a cured, water soluble composition of matter comprising a copolymer of acrylamide and glycidyl methacrylate.

DETAILED DESCRIPTION OF THE INVENTION

Novel curable, water soluble copolymers of vinylpyrrolidone with glycidyl acrylate (copolymer VP-GA) and copolymers of acrylamide with glycidyl methacrylate (copolymer AA-GMA) have been prepared. The copolymers are crosslinked with water soluble secondary aromatic diamines or aliphatic ring diamines to provide water soluble, curable compositions of matter. Once the compositions have been cured, they are non-swellable.

The compositions of the present invention are useful as binders, coatings, and adhesives. The copolymers of the present invention can be stored in aqueous solutions at room temperature for long periods of time, ranging from a few day to months. The novel cured, non-swellable, copolymers of the present invention are especially useful a binder material for fiberglass and glass fibers. Other applications include use as coatings and adhesives without the need to utilize an organic solvent.

Water soluble polymers that are useful in the preparation of the copolymers of the present invention include, but are not limited to, poly (vinylpyrrolidone), poly(acrylamide), poly(acrylic acid), poly (sodium acrylate), poly(sodium styrene sulfonate).

In one preferred embodiment, the present invention provides a curable, water soluble copolymer of vinylpyrrolidone and glycidyl acrylate (copolymer VP-GA). Polyvinylpyrroline (PVP) is a water soluble polymer that is prepared by free radical polymerization of vinylpyrrolidone. Polyvinylpyrrolidone is represented by the following formula:

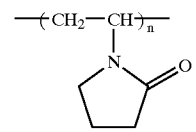

wherein n is a positive integer ranging from about 5 to about 90,000.

The weight average molecular weight of the polyvinylpyrolidone is generally in the range of about 1000 to about 10,000,000 g/mol, more preferably in the range of about 1,000 to about 5,000,000 g/mol and most preferably in the range of about 2,500 to about 1,000,000 g/mol.

Figure 2:
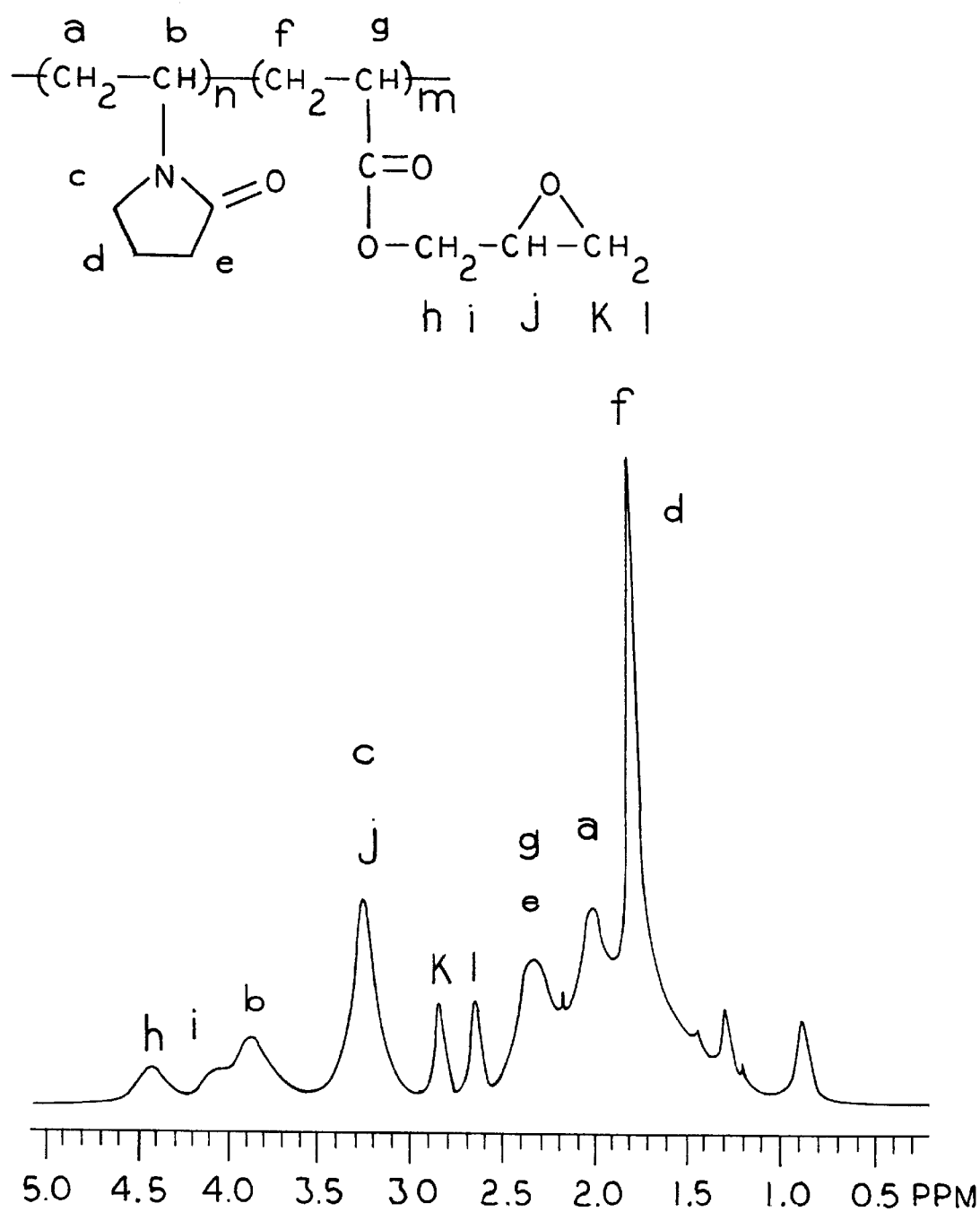
FIG. 2 is the $^1$H-NMR spectrum of a copolymer of vinylpyrrolidone and glycidyl acrylate in chloroform-$d_6$ at room temperature.
Figure 3:
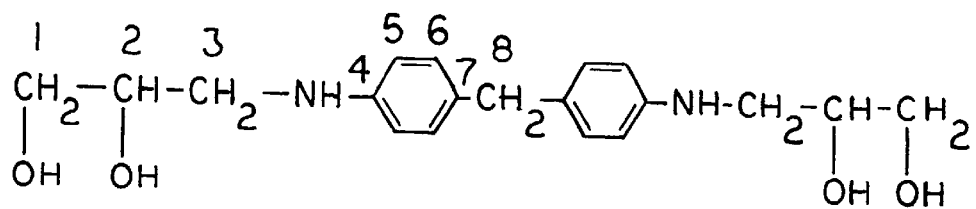
FIG. 3 is the $^{13}$C-NMR spectrum of the reaction product of methylenedianilene with glycidol in DMSO-$d_6$ at room temperature.
Figure 3:
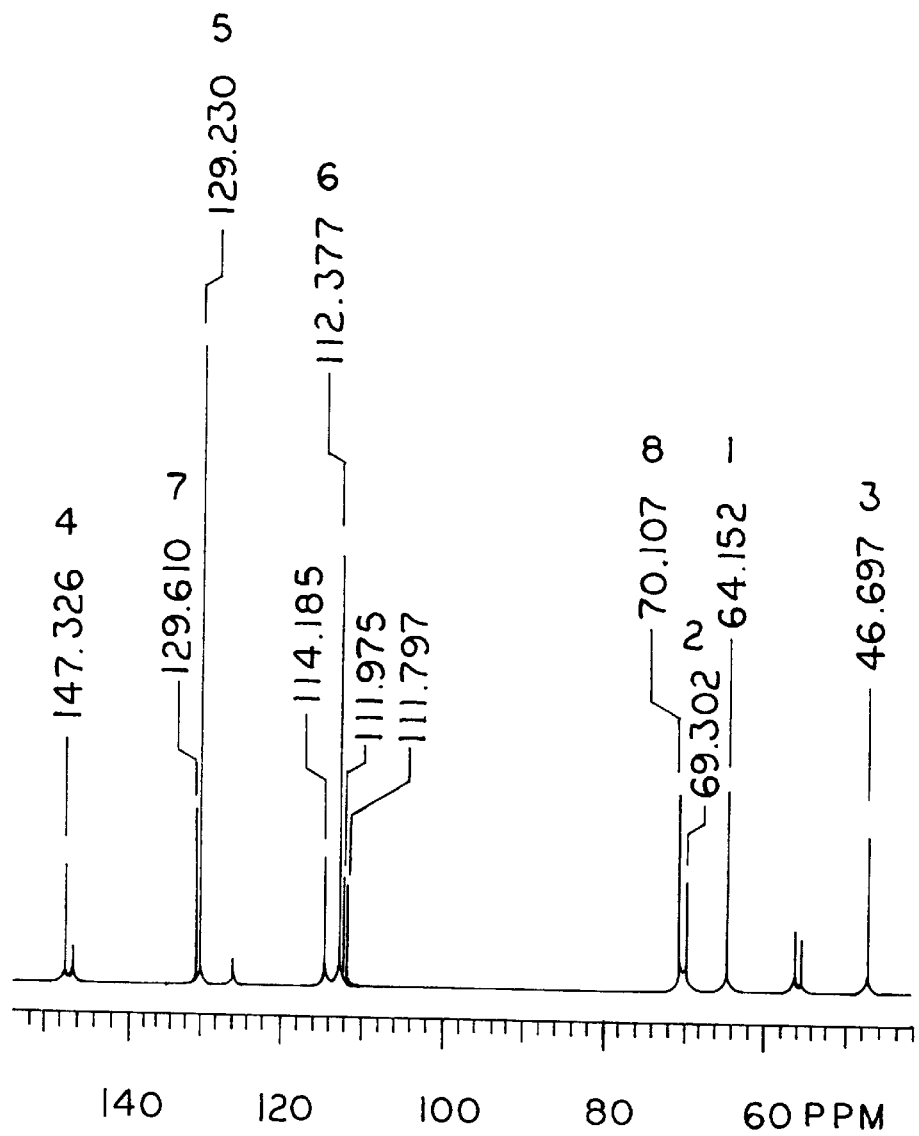
Figure 4:
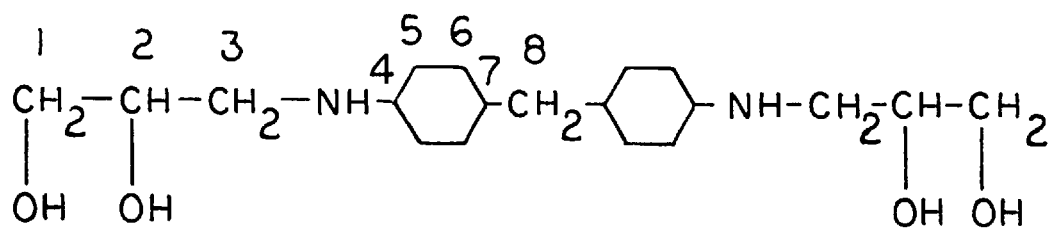
FIG. 4 is the $^{13}$C-NMR spectrum of the reaction product of methylene-bis-(cyclohexyl-amine) with glycidol in DMSO-$d_6$ at room temperature.
Figure 4:
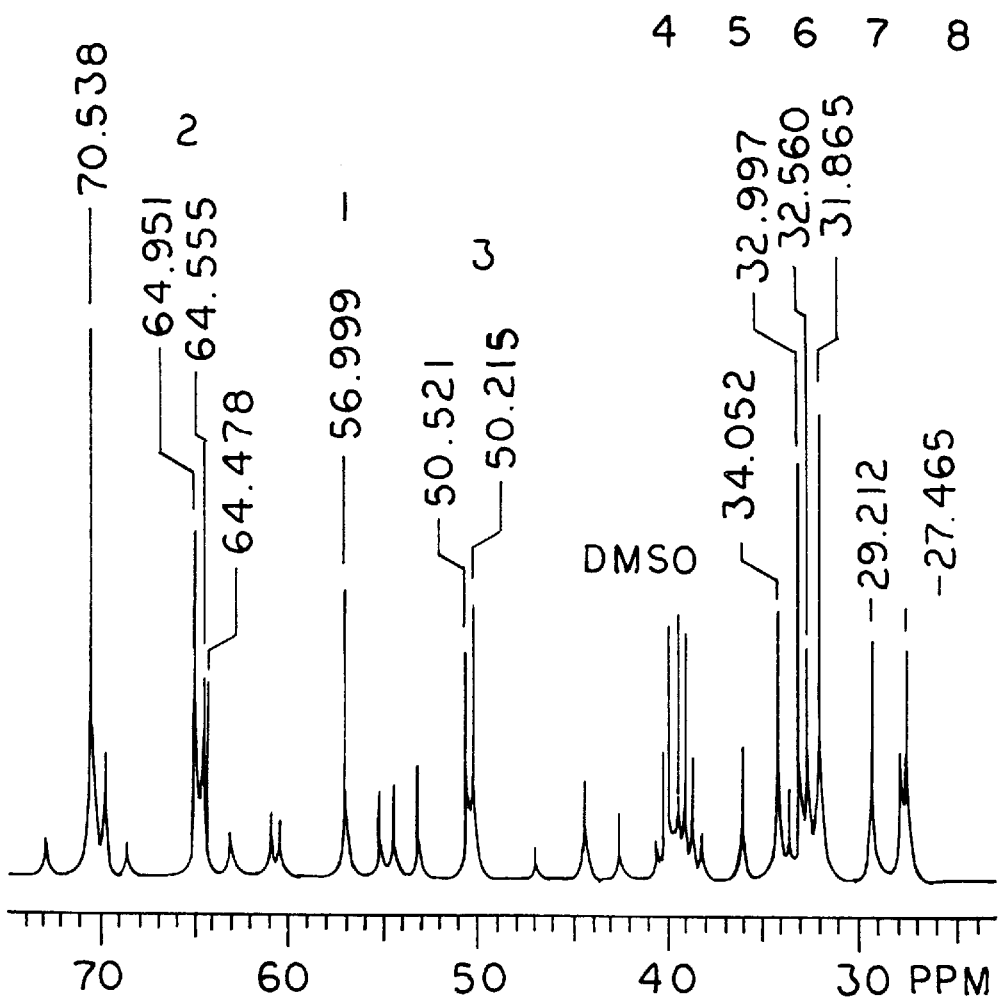
Figure 5:
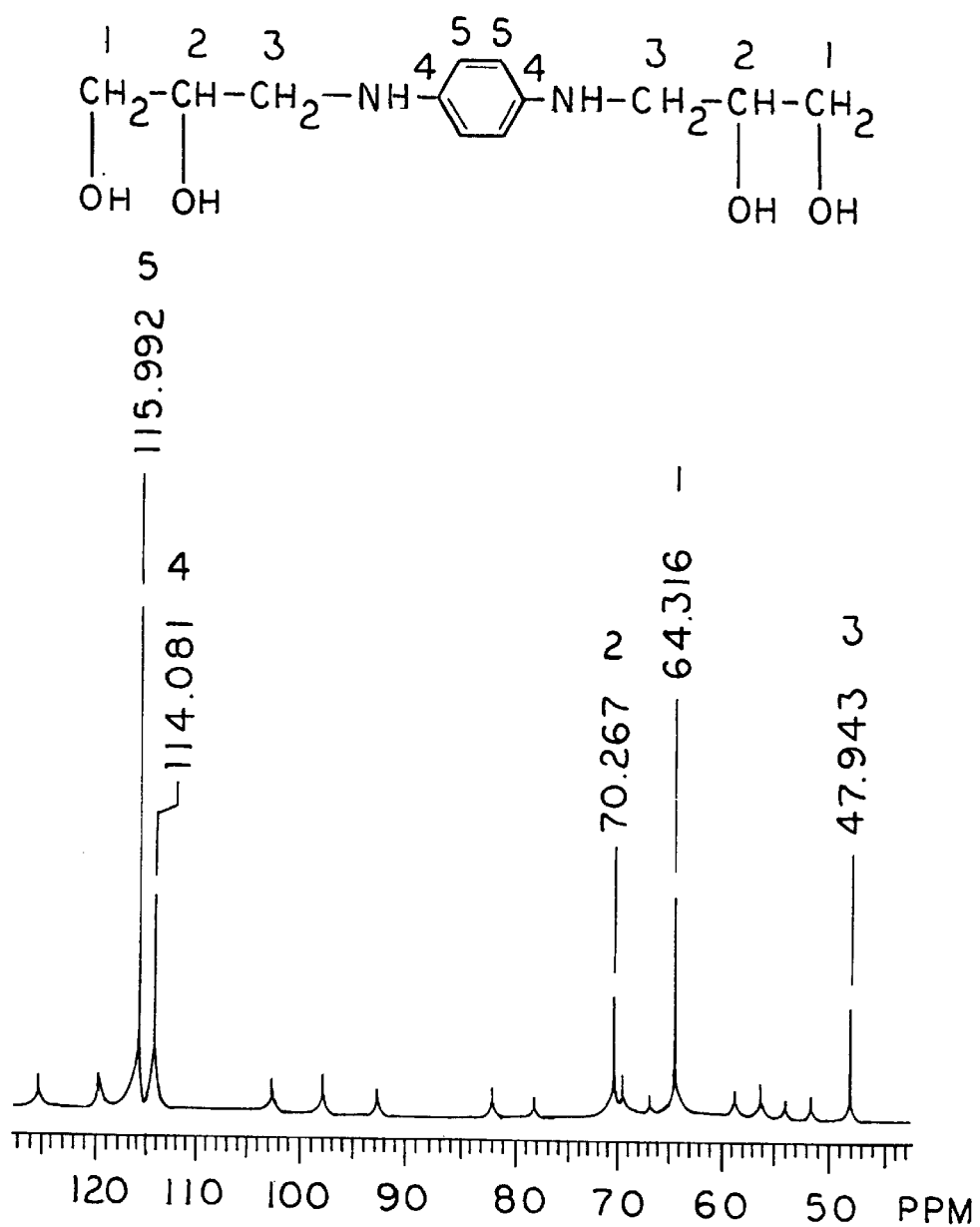
FIG. 5 is the $^{13}$C-NMR spectrum of the reaction product of phenylene-diamine with glycidol in DMSO-$d_6$ at room temperature.

The vinylpyrrolidone is copolymerized with glycidyl acrylate to form a copolymer of polyvinylpyrrolidone with glycidyl acrylate. The copolymer of polyvinylpyrrolidone and glycidyl acrylate is generally represented by the following formula:

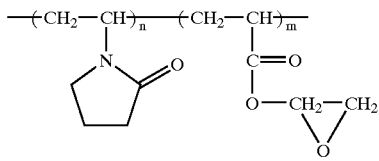

wherein n is a positive integer in the range of about 1 to about 90,000 and wherein m is a positive integer in the range of about 1 to about 90,000. The incorporation of glycidyl acrylate (GA) in the copolymer can be calculated according to either one of the following equations by using the areas of the peaks of the NMR spectrum for the copolymer of polyvinylpyrrolidone and glycidyl acrylate shown in FIG. 2:

$$\text{Incorporation of GA} = \frac{\text{Area of peak }(h)}{\text{Area } f \text{ peak }(i+b)} \times 100 \text{ (mole \%)}$$

or $$\text{Incorporation of GA} = \frac{\text{Area of peak }(k)}{\text{Area of peak }[(c+j-k/2+k)]} \times 100 \text{ (mole \%)}$$

The copolymer of vinylpyrrolidone and glycidyl acrylate is readily dissolved in water and forms a clear solution. Representative copolymers of vinylpyrrolidone and glycidyl acrylate are shown in Table I below.

TABLE I

Copolymerization of vinylpyrrolidone and glycidyl acrylate

| Example | Feed of GMA (mole %) | Incorp. of GMA (mole %) | EEW* (g/mol) | Yield (weight %) | Time (hr) | Temp. (° C.) | Monomer (M/L) | AIBN (M/L × 10³) |
|---|---|---|---|---|---|---|---|---|
| 1 | 9.3 | 8.2 | 1246 | 95 | 4 | 50 | 4.49 | 2.79 |
| 2 | 8.8 | 22.7 | 506 | 66 | 3 | 50 | 8.94 | 4.71 |
| 3 | 13.4 | 25.1 | 459 | 90 | 2 | 50 | 4.43 | 3.02 |
| 4 | 17.9 | 46.7 | 255 | 31 | 18 | 50 | 2.19 | 1.50 |
| 5 | 22.5 | 45.2 | 263 | 66 | 4 | 50 | 2.19 | 1.56 |
| 6 | 27.0 | 39.5 | 298 | 84 | 4 | 50 | 4.39 | 3.14 |
| 7 | 31.9 | 43.1 | 275 | 81 | 1.5 | 50 | 4.31 | 3.16 |
| 8 | 36.1 | 45.5 | 261 | 95 | 4 | 50 | 4.34 | 3.09 |
| 9 | 17.8 | 52.1 | 230 | 37 | 4 | 50 | 2.92 | 1.60 |
| 10 | 22.5 | 59.5 | 204 | 46 | 15 | 50 | 2.91 | 1.61 |
| 11 | 13.3 | 31.4 | 371 | 63 | 5 | 50 | 2.94 | 1.61 |

*The abbreviation EEW represents the epoxy equivalent weight.

In another preferred embodiment, the present invention provides a cured, non-swellable, composition of matter comprising a copolymer of acrylamide (AA) and glycidyl methacrylate. Polyacrylamide (PAA) is represented by the following formula:

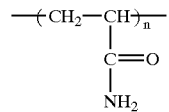

wherein n is a positive integer in the range of about 5 to about 90,000.

The acrylamide is copolymerized with glycidyl methacrylate to form a copolymer of acrylamide and glycidyl methacrylate. The copolymer of acrylamide and glycidyl methacrylate is generally represented by the following formula:

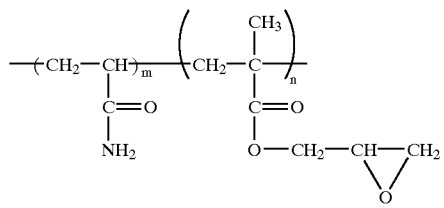

wherein m is a positive integer in the range of about 1 to about 90,000, and wherein n is a positive integer in the range of about 1 to about 90,000.

Figure 1:
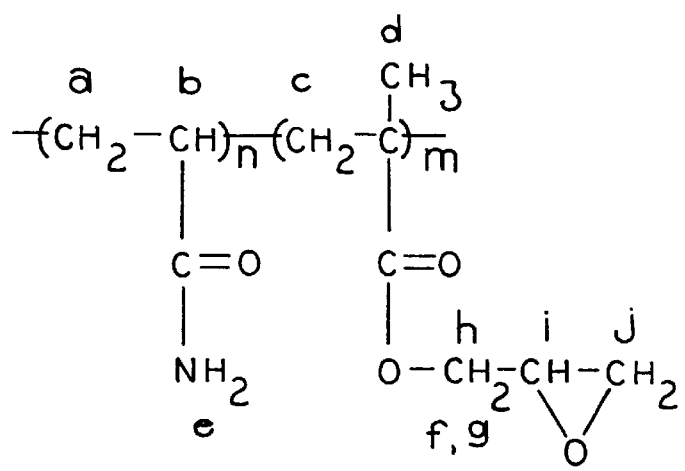
FIG. 1 is the $^1$H-NMR spectrum of a copolymer of acrylamide and glycidyl methacrylate in DMSO-$d_6$ at room temperature.
Figure 1:
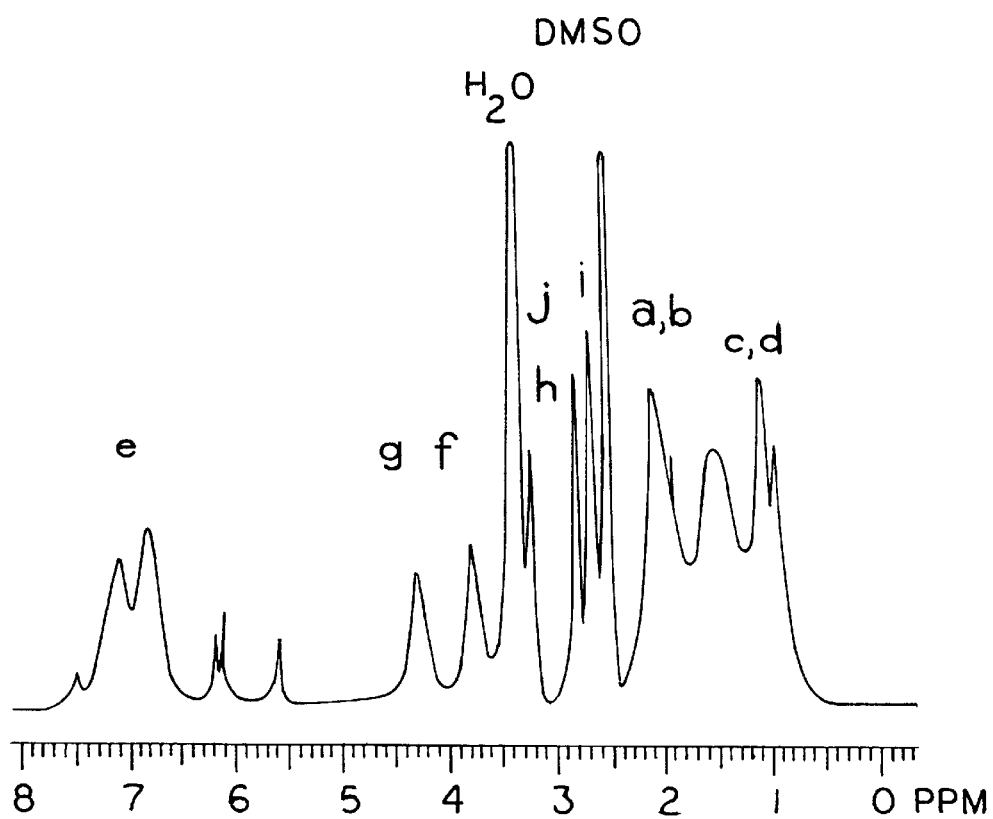

FIG. 1 is the ¹H-NMR spectrum of a copolymer of acrylamide with glycidyl methacrylate in DMSO-$d_6$ at room temperature. The incorporation of the comonomer of glycidyl methacrylate in the copolymer is calculated from the ¹H-NMR spectrum of a copolymer of acrylamide with glycidyl methacrylate (GMA) according to the following equation:

$$\text{Incorporation of GMA} = \frac{\text{Area of peak }(f+g)}{\text{Area of peak }(f+g+e)} \times 100 \text{ (mole \%)}$$

Table II, below, shows the representative copolymerizations of acrylamide with glycidyl methacrylate.

TABLE II

Copolymerization of acrylamide with glycidyl acrylate

| Example | Feed of GMA (mole %) | Incorp. of GMA (mole %) | EEW* (g/mol) | Yield (weight %) | Polymerization Conditions | | | |
|---|---|---|---|---|---|---|---|---|
| | | | | | Time (hr) | Temp. (° C.) | Monomer (M/L) | AIBN (M/L × 10$^3$) |
| 15 | 11 | 14.9 | 547 | 98.6 | 5 | 55 | 1.64 | 10.5 |
| 16 | 17.8 | 20.4 | 419 | 95.4 | 22 | 55 | 1.97 | 7.3 |
| 17 | 24.9 | 23.8 | 369 | 74.6 | 16 | 55 | 1.85 | 7.01 |
| 18 | 11.3 | 17.6 | 474 | 77 | 4.5 | 55 | 2.11 | 6.57 |
| 19 | 17.6 | 31.7 | 295 | 71.2 | 4 | 47 | 0.99 | 3.98 |
| 20 | 16.8 | 19.3 | 439 | 60.5 | 2.5 | 47 | 1.36 | 5.03 |
| 21 | 11 | 12.3 | 648 | 38 | 2.5 | 47 | 1.2 | 5.45 |
| 22 | 33.3 | 36.5 | 266 | 23.6 | 16 | 47 | 1.06 | 4.13 |
| 23 | 24.9 | 30.3 | 305 | 84.4 | 3 | 55 | 2.06 | 10.4 |
| 24 | 33.3 | 40 | 249 | 59 | 3 | 55 | 1.93 | 10.85 |
| 25 | 29 | 33 | 286 | 73.1 | 3 | 55 | 2.01 | 11.46 |
| 26 | 27.1 | 36.6 | 265 | 79.1 | 3 | 55 | 2.16 | 9.2 |

*The abbreviation EEW represents the epoxy equivalent weight.

The water soluble copolymers of the present invention are further crosslinked with a aromatic amine or an aliphatic ring diamine to form a cured, non-swellable, compositions of matter. The crosslinker employed in the present invention to crosslink the acrylamide-glycidyl methacrylate and vinylpyrrolidone-glycidyl acrylate copolymers can be any water soluble aromatic or aliphatic amine that can be used to crosslink epoxy resins. The crosslinking agent, however, is preferably an water soluble secondary aromatic diamine or an aliphatic ring diamine.

Especially, suitable aromatic diamines include, but are not limited to, methylenedianilane (MDA), and phenylenediamine (PDA). Methylenedianilane (MDA), phenylenediamine (PDA) are modified with glycidol to render each aromatic amine water soluble.

A suitable aliphatic ring diamine that can be utilized to crosslink the copolymers of the present invention is methylenebis(cyclohexylamine) (MBCHA).

One preferred crosslinking agent is methylenedianilane (MDA), which has been modified with glycidol. The modification of water insoluble methylenedianilane with glycidol to form water soluble N,N'-di(2,3,-propyldiol)-methyleneaniline (MDAG) is represented by the following reaction scheme:

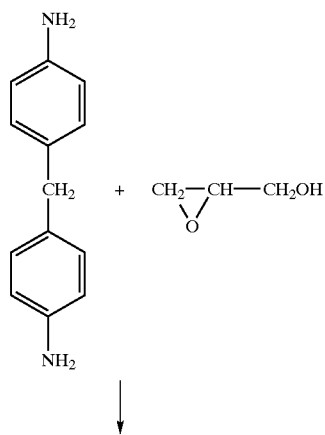

-continued

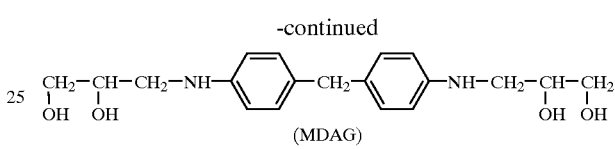

(MDAG)

The modified methylenedianilene can be used as a crosslinker for poly(vinylpyrrolidone-glycidyl acrylate) or poly(acrylamide-glycidyl methacrylate), resulting in resins that have strong mechanical properties and that do not swell in water after curing.

The modification of water insoluble phenylenediamine by glycidol to form water soluble N,N'-di(propyldiol)-phenylenediamine (PDAG) is represented by the following reaction scheme:

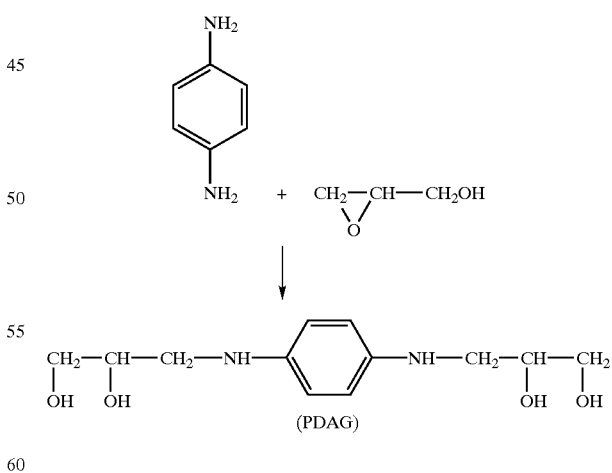

(PDAG)

The modification of water insoluble methylenebis(cyclohexylamine) (MBCHA) with glycidol to form water soluble N,N'-(2,3-propyldiol)-4,4-methylenebis-(cyclohexylamine) (MBCHAG) is represented by the following reaction scheme:

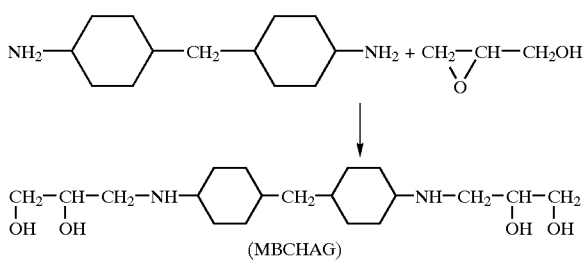

(MBCHAG)

The present invention also provides a process for the preparation of water soluble, curable compositions of matter. In general, the process for the preparation of the water soluble, curable compositions of matter involves reacting water soluble monomers having at least one epoxy group to create a water soluble copolymer with at least one epoxy group. The copolymers are then crosslinked with one of a water soluble secondary aromatic diamine or an aliphatic ring diamine to create a cured, non-swellable, composition of matter.

The copolymers of the present invention are generally prepared by a solution free radical polymerization process. The copolymerizations are carried out in a suitable organic solvent, such as tetrahydrofuran (THF), N-methyl-pyrrolidone, ethanol, 2-propanol and dipropylglycol.

An initiator in an amount effective to initiate the copolymerization reaction is required. Suitable initiators for the copolymerizations reactions include, but are not limited to, azo initiators and peroxide initiators.

Suitable azo initiators include, but are not limited to, azobisisobutylonitrile (AIBN) and 1,1'-azobis(cyclohexane carbonitrile). Suitable peroxide initiators include, but are not limited to, benzoyl peroxide and dicumyl peroxide. The preferred initiator for the copolymerization reactions is azobisisobutylonitrile (AIBN).

GENERAL EXPERIMENTAL

The following examples are set forth to describe the water soluble, curable compositions of matter of the present invention in further detail and to illustrate the methods of preparation described by the present invention. The examples, however, should not be construed as limiting the present invention in any manner. Throughout this specification and claims, all percentages are by weight and are based on the total weight of the copolymers, unless otherwise specifically stated.

Synthesis of Acrylamide-glycidyl Methacrylate (AA-GMA) Copolymer

The copolymerization of acrylamide with gylcidyl methacrylate was carried out in solution. In a 100 milliliter (ml) round bottom flask, 6 grams of acrylamide, 4 grams of glycidyl methacrylate and 90 milligrams of azobisisobutylonitrile (AIBN) were added. 50 milliliters of tetrahydrofuran (THF) was added to the flask as a solvent. Nitrogen was introduced into the flask to replace the oxygen for about 45 minutes. The flask was then placed in an oil bath at a temperature of about 55° C. with stirring. Copolymerization was performed for about 3 hours under nitrogen atmosphere. The resulting solid copolymer of acrylamide and glycidyl methacrylate was filtered and washed with acetone to remove the unreacted monomers and the solvent. The copolymer was then dried overnight in an oven at room temperature under vacuum.

The structure of the copolymers of the present invention were characterized by NMR spectroscopy. The copolymers were also evaluated for solubility in distilled water, adhesion to glass, and for mechanical and thermal properties.

All NMR spectra were obtained through the use of a Gemini 200 FT-NMR spectrometer using Varian software, and operating at 200 MHz for proton and 50 MHz for carbon-13. The solvents used in the NMR analysis were deuterated dimethylsulfoxide (DMSO-d6) for the copolymer of acrylamide with glycidyl methacrylate, and chloroform-d for the copolymer of vinylpyrrolidine with glycidyl acrylate. The chemical shifts were references to tetramethylsilane (TMS) at 0.00 ppm for both proton and carbon-13 spectra.

Preparation of Amine Curing Agent

The water insoluble aromatic amine, methylenedianiline (MDA), was reacted with glycidol to form a water soluble secondary amine curing agent. Briefly, 9.9 grams of methylenedianiline and 30 milliliters (ml) of toluene were placed into a 250 ml round bottom flask fitted with a dropping funnel. A solution comprising 7.4 grams of glycidol in 15 ml of toluene was prepared. The toluene/glycidol solution was added to the methylenedianiline solution dropwise, via the dropping funnel, under stirring over a period of 20 minutes. The solution was separated into two distinct layers, the top layer containing toluene, and the bottom layer containing the methylenedianiline modified with glycidol, namely N,N'-di(2,3-propyldiol)-methylene-dianilene (MDAG).

Solubility of Copolymers

The solubility of representative copolymers of the present invention were evaluated for solubility in water. A 12 milliliter (ml) vial was charged with 1.5 grams of copolymer and 8.5 milliliters of distilled water. The copolymer was allowed to dissolve in the distilled water. The results of the solubility testing indicate that the copolymers of the present invention are readily soluble in water.

Adhesion Studies

The adhesion of representative copolymers of the present invention to glass was determined. Two (2) drops of a copolymer solution (15% by weight) were placed on a precleaned glass microscope slide. 1–2 drops of an amine solution (15% by weight), depending on the incorporation of epoxy groups and the amine used, were placed and mixed with the copolymer solution on the glass microscope slide. The copolymer-amine mixture was dried on the microscope slide at room temperature, and then cured in an oven at a temperature of about 170° C. for about 1 minute to about 1 hour, more preferably the copolymer-amine mixture is cured at 170° C. for about 15 minutes. The glass microscope slide with the cured copolymer thereon was placed in a wide mouth bottle filled with distilled water.

The results of the adhesion studies are shown in Table III, below. The use of water soluble aliphatic amines, such as diethylenetriamine, triethylenetetramine, melamine, urine, and ethanolamine, were compared to the use of a water insoluble aliphatic ring amine, 4,4-methylenebis-(cyclohexylamine), as the curing agent for the copolymers of the present invention. As Table III shows, the copolymers cured with aliphatic amine (Example Nos. C30–C34) experienced swelling and poor adhesion to the glass microscope slide within 5 minutes after placing the coated microscope slide into water. In comparison, the copolymers of the present invention that were cured with the aliphatic ring amine, 4,4-methylenebis-(cyclohexylamine) (Example Nos. 36–40), exhibited no swelling and the copolymers adhered to the glass microscope slides for 170 days after placement into water. Example No. 41, a copolymer having GMA incorporation of 19.3 mole percent, exhibited only slight swelling within 5 minutes after placement into water, but also exhibited good adherance to the glass microscope slide.

TABLE III

Adhesion of copolymer on glass microscope slides

| Example | Incorp. of GMA (mole %) | Amine used | Temp. (° C.) | Cure Time (min) | Adhesion performance |
|---|---|---|---|---|---|
| C30 | 36.6 | Diethylenetriamine | 170 | 60 | poor/swelling |
| C31 | 36.6 | triethylenetetramine | 170 | 60 | poor/swelling |
| C32 | 36.6 | melamine | 170 | 60 | poor/swelling |
| C33 | 36.6 | urine | 170 | 60 | poor/swelling |
| C34 | 36.6 | ethanolamine | 170 | 60 | poor/swelling |
| 35 | 36.6 | 4,4-methylenebis-(cyclohexylamine) | 170 | 60 | good/no swelling |
| 36 | 36.6 | 4,4-methylenebis-(cyclohexylamine) | 170 | 30 | good/no swelling |
| 37 | 36.6 | 4,4-methylenebis-(cyclohexylamine) | 170 | 15 | good/no swelling |
| 38 | 36.6 | 4,4-methylenebis-(cyclohexylamine) | 170 | 10 | good/no swelling |
| 39 | 36.6 | 4,4-methylenebis-(cyclohexylamine) | 170 | 5 | good/no swelling |
| 40 | 36.6 | 4,4-methylenebis-(cyclohexylamine) | 170 | 1 | good/no swelling |
| 41 | 19.3 | 4,4-methylenebis-(cyclohexylamine) | 170 | 30 | good/slight swelling |

Adhesion of the copolymers of either vinylpyrrolidone and glycidyl acrylate or acrylamide and glycidyl methacrylate crosslinked with aromatic amines, such as MDAG and PDAG, and water insoluble aliphatic ring amines, such as MBCHAG to glass microscope slides was evaluated. The results of the studies are shown in Table IV below.

As can be seen from Table IV copolymers of vinylpyrrolidone and glycidyl acrylate crosslinked by MDAG and having a glycidyl acrylate incorporation of at least 45 mole percent form a clear, smooth and tough film on the surface of the glass microscope slide, and do not exhibit anyswelling after 85 days in water. Copolymers of vinylpyrrolidone and glycidyl acrylate crosslinked by PDAG and having a glycidyl acrylate incorporation of at least 45 mole percent form a dark, smooth and tough film on the surface of the glass microscope slide, and do not exhibit any swelling after 85 days in water. Copolymers of vinylpyrrolidone and glycidyl acrylate crosslinked by MBCHAG and having a glycidyl acrylate incorporation of at least 45 mole percent form a dark, smooth and tough film on the surface of the glass microscope slide, and do not exhibit any swelling after 10 days in water.

TABLE IV

Adhesion of PVP-GA copolymer cured with amines to glass microscope slides

| Example | Incorp. of GA (mole %) | Amine used | Curing Temp (° C.) | Time (min) | Film Formation | Adhesion Performance |
|---|---|---|---|---|---|---|
| 42 | 59.5 | MDAG | 170 | 15 | clear, smooth, tough | no swelling-85 days |
| 43 | 45.5 | MDAG | 170 | 15 | clear, smooth, tough | no swelling-85 days |
| 44 | 36.6 | MDAG | 170 | 15 | clear, smooth, tough | partial swelling within 24 hours |
| 45 | 22.7 | MDAG | 170 | 15 | clear, smooth, tough | partial swelling within 24 hours |
| 46 | 59.5 | PDAG | 170 | 15 | dark, smooth, tough | no swelling-85 days |
| 47 | 45.5 | PDAG | 170 | 15 | dark, smooth, tough | no swelling-85 days |
| 48 | 36.6 | PDAG | 170 | 15 | dark, smooth, tough | partial swelling within 24 hours |
| 49 | 22.7 | PDAG | 170 | 15 | dark, smooth, tough | partial swelling within 24 hours |
| 50 | 59.5 | MBCHAG | 170 | 15 | clear, smooth, tough | no swelling-10 days |
| 51 | 45.5 | MBCHAG | 170 | 15 | clear, smooth, tough | no swelling-10 days |
| 52 | 36.6 | MBCHAG | 170 | 15 | clear, smooth, tough | partial swelling within 24 hours |
| 53 | 22.7 | MBCHAG | 170 | 15 | clear, smooth, tough | partial swelling within 24 hours |

TABLE V

Adhesion of PAA-GMA copolymer cured with amines to glass microscope slides

| Example | Incorp. of GA (mole %) | Amine used | Curing Temp (° C.) | Time (min) | Film Formation | Adhesion Performance |
|---|---|---|---|---|---|---|
| 54 | 35.5 | MDAG | 170 | 15 | clear, smooth, tough | no swelling-85 days |
| 55 | 25.6 | MDAG | 170 | 15 | clear, smooth, tough | no swelling-85 days |
| 56 | 19.3 | MDAG | 170 | 15 | clear, smooth, tough | partial swelling within 24 hours |
| 57 | 35.5 | PDAG | 170 | 15 | dark, smooth, tough | no swelling-85 days |
| 58 | 25.6 | PDAG | 170 | 15 | dark, smooth, tough | no swelling-85 days |
| 59 | 19.3 | PDAG | 170 | 15 | dark, smooth, tough | partial swelling within 24 hours |
| 60 | 35.5 | MBCHAG | 170 | 15 | clear, smooth, tough | no swelling-10 days |
| 61 | 25.6 | MBCHAG | 170 | 15 | clear, smooth, tough | no swelling-10 days |
| 62 | 19.3 | MBCHAG | 170 | 15 | clear, smooth, tough | partial swelling within 24 hours |

As shown in Table V, above, copolymers of acrylamide and glycidyl methacrylate crosslinked by MDAG and having a glycidyl methacrylate incorporation of at least 25 mole percent form a clear, smooth and tough film on the surface of the glass microscope slide, and do not exhibit any swelling after 85 days in water. Copolymers of acrylamide and glycidyl methacrylate crosslinked by PDAG and having a glycidyl methacrylate incorporation of at least 25 mole percent form a dark, smooth and tough film on the surface of the glass microscope slide, and do not exhibit any swelling after 85 days in water. Copolymers of acrylamide and glycidyl methacrylate crosslinked by MBCHAG and having a glycidyl methacrylate incorporation of at least 25 mole percent form a dark, smooth and tough film on the surface of the glass microscope slide, and do not exhibit any swelling after 10 days in water.

Dynamic Mechanical Thermal Analysis

Dynamic Mechanical Thermal Analysis (DMTA) was performed on representative copolymers of the present invention. DMTA measures the effect of reaction components and processing conditions on mechanical properties and thermal transitions. In particular, G' (storage modulus), G" (loss modulus) and tan δ (the ration of G' to G") are measured.

The DMTA experiments were carried out on a model Mark II from Polymer Laboratories. The general setup for the DMTA is as follows:

1. Single cantilever mode;
2. Horizontal clamp arrangement;
3. Length=11 mm, width=12 mm, thickness=0.3 mm
4. Strain selection=4X
5. Frequencies selection=1 Hz The general procedure for preparation of samples for carrying out DMTA is as follows:

1. Cut a strip of glass tape (36 mm in length);
2. Pipet about 60 μm of copolymer and curing agents onto the glass tape;
3. Dry copolymer and curing agent at room temperature;
4. Load glass tape with binder into horizontal clamps;
5. While slightly tensioning the glass tape, tighten the clamp screws;
6. Start DMTA.

Figure 6:
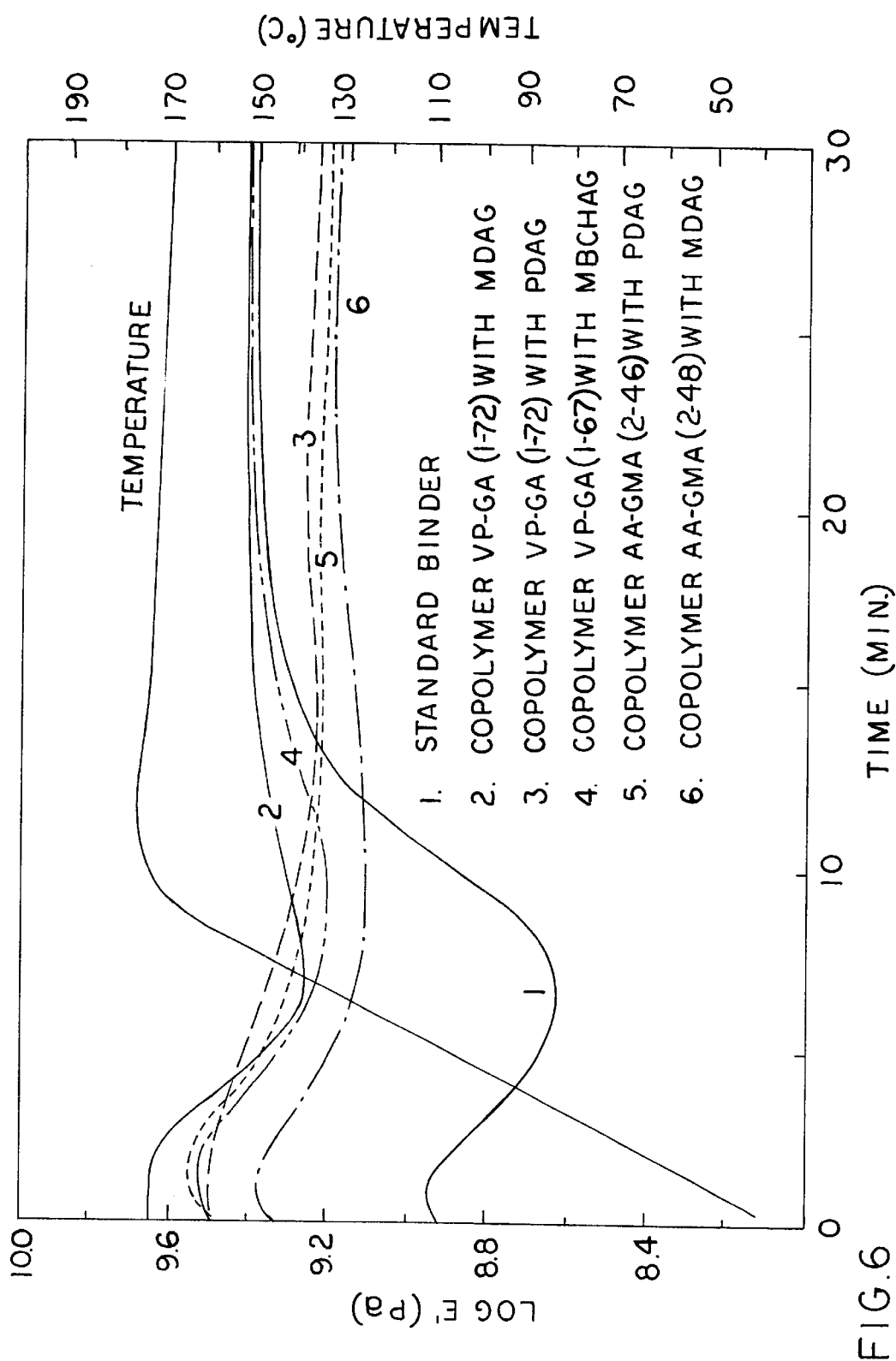
FIG. 6 are the DMTA results of representative copolymers, namely copolymers of vinylpyrrolidone and glycidyl acrylate and copolymers of acrylamide and glycidyl methacrylate, with various curing agents.

FIG. 6 shows that dynamic mechanical thermal analysis curves of copolymers of vinylpyrrolidone with glycidyl acrylate and acrylamide with glycidyl methacrylate. The dynamic mechanical thermal analysis curves for the copolymers of the present invention were compared to a standard phenolic binder.

Based on the foregoing disclosure, it is therefore demonstrated that the objects of the present invention are accomplished by the cured, non-swellable, compositions of matter and methods of preparation disclosed herein. The cured, non-swellable, compositions of the present invention are particularly well suited as binder, adhesive and coating compositions. It should be understood that the selection of specific water soluble monomers, crosslinking agents, copolymerization reaction conditions can be determined by one having ordinary skill in the art without departing from the spirit of the invention herein disclosed and described. It should therefore be appreciated that the present invention is not limited to the specific embodiments described above, but includes variations, modifications and equivalent embodiments defined by the following claims.

We claim:

1. A cured composition of matter comprising the reaction product of: a water soluble copolymer comprising vinylpyrrolidone and glycidyl acrylate; and a water soluble aromatic amine capable of crosslinking epoxy resins, wherein the water soluble aromatic amine is selected from the group consisting of

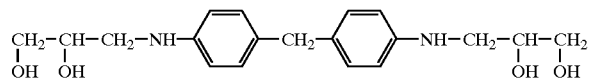

and

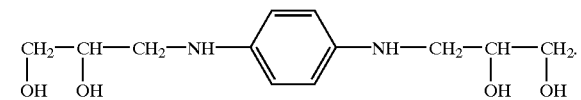

2. The composition of matter of claim 1, wherein the mole percent of glycidyl acrylate in said water soluble copolymer of vinylpyrrolidone and glycidyl acrylate is from about 45 to about 60.

3. A process for the preparation of a cured composition of matter comprising:
copolymerizing vinylpyrrolidone and glycidyl acrylate to form a copolymer;
crosslinking said copolymer of vinylpyrrolidone and glycidyl acrylate with a water soluble aromatic amine capable of crosslinking epoxy resins to form a cured copolymer, wherein the water soluble aromatic amine is selected from the group consisting of

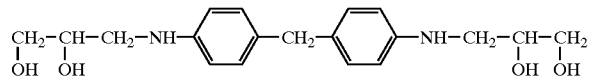

and

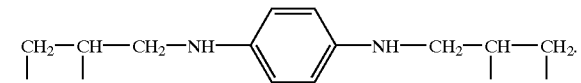

4. The process according to claim 3, wherein said step of crosslinking is conducted at a temperature in the range of about 160° C. to about 200° C.

5. The process according to claim 3, wherein said step of crosslinking is conducted for a duration of about 1 minute to about 1 hour.

6. The process according to claim 3, wherein said water soluble copolymer of vinylpyrrolidone and glycidyl acrylate comprises from about 45 to about 60 mole percent glycidyl acrylate.

7. The composition of claim 1, wherein the composition is one of an adhesive, a binder, or a coating.

* * * * *